(12) United States Patent
Suzuki

(10) Patent No.: US 8,972,367 B2
(45) Date of Patent: Mar. 3, 2015

(54) INFORMATION PROCESSING SYSTEM, SERVER APPARATUS, CONTROL METHOD OF SERVER APPARATUS, PROGRAM AND STORAGE MEDIUM

(75) Inventor: Hideyasu Suzuki, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1444 days.

(21) Appl. No.: 11/056,100

(22) Filed: Feb. 14, 2005

(65) Prior Publication Data

US 2005/0182786 A1 Aug. 18, 2005

(30) Foreign Application Priority Data

Feb. 16, 2004 (JP) ................................. 2004-038816
Feb. 1, 2005 (JP) ................................. 2005-025505

(51) Int. Cl.
*G06F 7/00* (2006.01)
*G06F 17/30* (2006.01)

(52) U.S. Cl.
CPC ................................ *G06F 17/3089* (2013.01)
USPC .......................... 707/705; 707/769; 709/203

(58) Field of Classification Search
None
See application file for complete search history.

(56) References Cited

U.S. PATENT DOCUMENTS

| | | | | |
|---|---|---|---|---|
| 5,765,170 | A * | 6/1998 | Morikawa | 1/1 |
| 6,058,428 | A * | 5/2000 | Wang et al. | 709/232 |
| 6,583,799 | B1 * | 6/2003 | Manolis et al. | 715/838 |
| 6,636,259 | B1 * | 10/2003 | Anderson et al. | 348/211.3 |
| 6,829,006 | B1 * | 12/2004 | Hayashi | 348/231.2 |
| 7,406,664 | B1 * | 7/2008 | Morton et al. | 715/809 |
| 2002/0184120 | A1 | 12/2002 | Suzuki et al. | 705/30 |
| 2003/0007174 | A1 | 1/2003 | Takagi et al. | 358/1.15 |
| 2003/0074373 | A1 * | 4/2003 | Kaburagi et al. | 707/104.1 |
| 2003/0078994 | A1 | 4/2003 | Ishizuka | |
| 2003/0218624 | A1 * | 11/2003 | Quintana et al. | 345/716 |
| 2004/0064339 | A1 * | 4/2004 | Shiota et al. | 705/1 |

FOREIGN PATENT DOCUMENTS

| | | |
|---|---|---|
| JP | 11-085652 | 3/1999 |
| JP | 2002-118806 | 4/2002 |
| JP | 2003-108477 | 4/2003 |

OTHER PUBLICATIONS

Sumiya Furukawa, "A Course on Creating Your First Website (Final Class): Making Your Website Public on the Server", Nikkei Personal Computing, Nikkei Business Publications, Inc., Sep. 20, 1999, vol. 345, p. 250-255. (with partial translation).
Japanese Office Action dated Apr. 27, 2010 issued during prosecution of related Japanese application No. 2005-025505.

* cited by examiner

*Primary Examiner* — Fred I Ehichioya
*Assistant Examiner* — Hasanul Mobin
(74) *Attorney, Agent, or Firm* — Fitzpatrick, Cella, Harper & Scinto

(57) ABSTRACT

A server apparatus of an album site has a data storage area DB, and manages data in relation to the name of a management unit which is a unit for collectively managing the data. A client apparatus manages a data group which contains at least one image file in the client apparatus in relation to a data group name corresponding to the data group, and uploads the data group and data group name to the server apparatus. The server apparatus determines whether a management unit name corresponding to the data group name uploaded from the client apparatus exists in the data storage area. If it is determined that no corresponding data group name exists, a new management unit name corresponding to the data group name is automatically defined, and the data group is stored in relation to the management unit name.

17 Claims, 13 Drawing Sheets

FIG. 6

ALBUM

| ALBUM#2 |

ALL_ITEM

| c:¥boke.jpg |
| c:¥2003 SPRING PICNIC |
| c:¥2003 SUMMER CAMP |

ITEM

URL

| http://www.hoge.co.jp/app |

FILES

NEWALBUM

BODY

FIG. 7

```
FUNC=regist
ALBUM=ALBUM#2
NAME=boke.jpg
BODY=(OMITTED)
```

FIG. 8

```
FUNC=regist
ALBUM=2003 SPRING PICNIC
NAME=a.jpg
BODY=(OMITTED)
```

F I G. 9

```
FUNC=regist
ALBUM=2003 SPRING PICNIC
NAME=b.jpg
BODY=(OMITTED)
```

FIG. 10

```
FUNC=regist
ALBUM=2003 SUMMER CAMP
NAME=a.jpg
BODY=(OMITTED)
```

FIG. 11

```
FUNC=regist
ALBUM=2003 SUMMER CAMP
NAME=c.jpg
BODY=(OMITTED)
```

F I G. 12

```
FUNC=regist
CURRENT=ALBUM#2
ALBUM=2003 SUMMER CAMP
NAME=a.jpg
BODY=(OMITTED)
```

INFORMATION PROCESSING SYSTEM, SERVER APPARATUS, CONTROL METHOD OF SERVER APPARATUS, PROGRAM AND STORAGE MEDIUM

FIELD OF THE INVENTION

The present invention relates to a Web album system capable of holding a plurality of image data in relation to each other in an album.

BACKGROUND OF THE INVENTION

Conventionally, a user (to be referred to as an owner hereinafter) who wants to exhibit image data such as still images and motion images to the public or to share the image data with other users uses a service by which he or she forms an album in an album site of a Web server, uploads and registers the image data in the album, and allows access of the album to a number of specific users (to be referred to as guests hereinafter), thereby sharing the image data by the owner and the guests.

The owner can designate an image file to be uploaded and upload the image file by dragging and dropping a plurality of image data for each file in a predetermined window displayed on browser software installed in his or her personal computer (PC).

On the other hand, the owner often arranges a plurality of image data by using directories and folders on the hard disk drive (HDD) of his or her own PC. For example, it is a common practice to form a folder named "2003 Athletic Meeting", and collectively manages image data related to the 2003 athletic meeting in this folder.

Assume that, under the circumstances as described above, the owner wants to show, to the guests, image files arranged in a PC folder named "2003 Spring Picnic" by using the Web album.

The owner first connects to the album site provided by the Web server which services the Web album, and selects an album to which the image data is to be uploaded. If there is no such album as "2003 Spring Picnic", the owner must form an album having this name on the Web server before album selection.

After that, the owner designates the image data in the folder named "2003 Spring Picnic", and uploads the designated image data to the Web server, thereby registering the image data in the album named "2003 Spring Picnic".

That is, the owner has already formed a folder named "2003 Spring Picnic" on the HDD of his or her PC and arranged the image data in this folder. To register these image data in the Web album on the network, however, the owner must form a Web album, set the album name by inputting the character string "2003 Spring Picnic" again, register the image data, and set additional attribute information.

Naturally, the owner must upload image data for each album. Therefore, when the owner wants to form a large number of albums, even an album name input operation alone is very troublesome.

In addition, if the owner wants to show the registered image data to the guests, he or she must set, for each album, a list of these guests to whom the image data is to be accessible. Accordingly, if the number of albums increases and at the same time the number of guests to whom these albums are to be accessible increases, the owner may make a number of mistakes by which he or she designates an originally unwanted person as a guest to whom his or her album is to be accessible.

SUMMARY OF THE INVENTION

The present invention, therefore, has been made in consideration of the above situation, and has as its object to alleviate the complication of an operation of uploading image files on a PC to a Web album site by designating the image files for each folder.

According to the first aspect of the present invention, an information processing system is a system comprising a server apparatus having a data storage area, and capable of managing data coupled with a management unit name, which is a unit for collectively managing the data, and a client apparatus connected to the server apparatus via a network, the client apparatus having a managing device adapted to manage data or a data group in the client apparatus by matching the data or data group to the corresponding date name or data group name, respectively; and sending device adapted to send the data group together with the data group name to the server apparatus, and the server apparatus comprises, determining device adapted to determine whether a management unit name corresponding to the data group name sent from the client apparatus exists in the data storage area; and storage device adapted to newly define a management unit name corresponding to the sent data group name in accordance with the determination result, and storing the sent data group in the data storage area coupled with the management unit name.

According to the second aspect of the present invention, a server apparatus is a device having a data storage area, is capable of managing data in relation to a management unit, which is a unit for collectively managing the data, and comprises a receiving device adapted to receive a data group and a corresponding data group name from a client apparatus connected to the server apparatus via a network, and determining device adapted to determine whether a management unit name corresponding to the received data group name exists in the data storage area, wherein a management unit name corresponding to the received data group name is newly defined in accordance with the determination result, and the received data group is stored in the data storage area coupled with the management unit name.

According to the third aspect of the present invention, a method of controlling a server apparatus having a data storage area, and capable of managing data matched to a management unit name which is a unit for collectively managing the data, comprising the steps of, receiving a data group and a corresponding data group name from a client apparatus connected to the server apparatus via a network, determining whether a management unit name corresponding to the received data group name exists in the data storage area; and newly defining a management unit name corresponding to the received data group name in accordance with the determination result, and storing the received data group in the data storage area coupled with the management unit name.

According to the fourth aspect of the present invention, a program is characterized by allowing a computer to execute the above control method.

According to the fifth aspect of the present invention, a storage medium is characterized by storing the above program in a computer-readable form.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 6 is a view showing the state in which the state shown in FIG. 4 is read out, and a variable set from the value of the argument of UPLOAD;

FIG. 7 is a view showing an HTTP POST request;

FIG. 8 is a view showing data to be posted by HTTP POST to URL;

FIG. 9 is a view showing data to be posted by HTTP POST to URL;

FIG. 10 is a view showing data to be posted by HTTP POST to URL;

FIG. 11 is a view showing data to be posted by HTTP POST to URL;

FIG. 12 is a view showing data to be posted by HTTP POST in the second embodiment.

DETAILED DESCRIPTION OF THE PREFERRED EMBODIMENTS

Preferred embodiments of the present invention will be described below.

First, an outline of the embodiments will be explained below.

In the embodiments, if not individual image data but a folder containing one or a plurality of image data is selected as an object to be uploaded to a storage device of a Web server, this folder is processed as an album to be managed by the Web server. This avoids cumbersome processing of forming albums and inputting the album names, and eliminates the need to repeat the uploading process for each album.

An album managed by the Web server is an example of a managed group of data managed by the Web server.

In addition, if no album having the same name as a folder to be uploaded exists on the Web server, a new album having the same name as the folder is automatically formed on the Web server, and the attribute information of an album chosen when the uploading process is activated is set as the attribute information of that album. This makes it unnecessary to set again attribute information including the registration of guests to whom the album is to be opened.

In this arrangement, when a plurality of image data arranged in a folder named "2003 Spring Picnic" on a client PC are to be registered in a Web album on the Web server, it is only necessary to simply designate and upload the folder.

Furthermore, the operation of setting album attributes can be minimized, so the convenience for a user can be improved.

Examples of the attribute information set in an album are the e-mail addresses of guests to whom the album is to be opened, information indicating whether to permit download of image data contained in the album, information indicating whether to permit printing of image data contained in the album by a printer of a guest to whom the album is opened, and information indicating whether to permit ordering of printing of image data contained in the album to a printing service.

Preferred embodiments of the present invention will now be described in detail in accordance with the accompanying drawings.

First Embodiment

Figure 1:
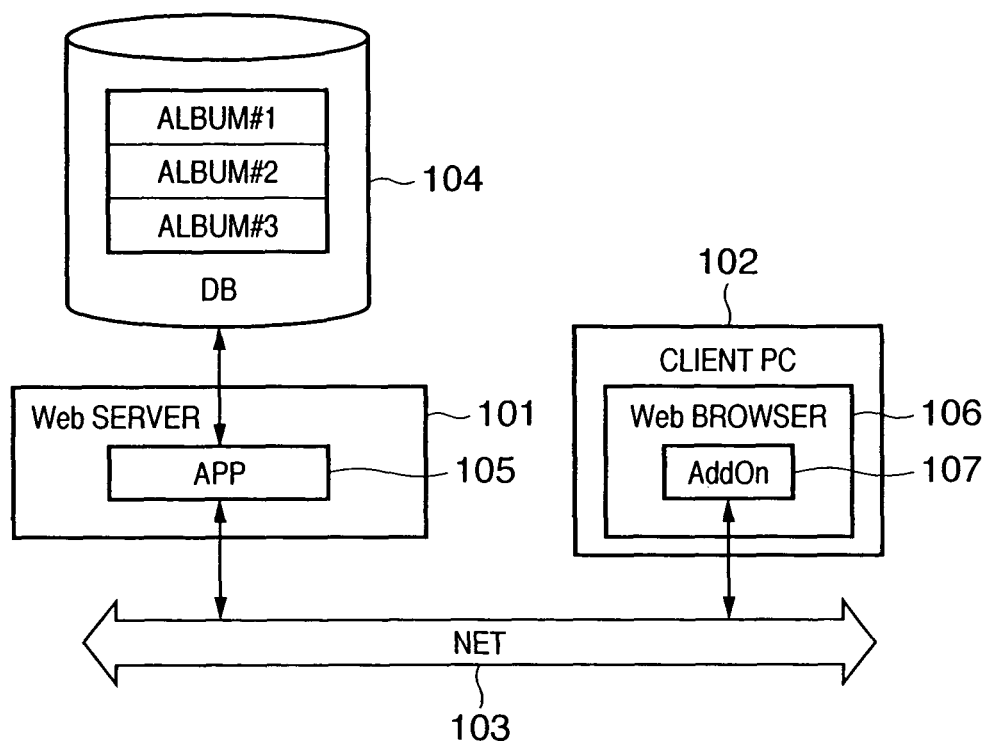
FIG. 1 is a block diagram showing the overall arrangement of a Web album system.

FIG. 1 is a block diagram showing the overall arrangement of a Web album system.

A Web server 101 which provides a Web album service and a client PC (Personal Computer) 102 used by an owner are connected by a network (NET) 103.

A database (DB) 104 holds all data, including image data, album-related information, and the like, necessary to execute the Web album service. Referring to FIG. 1, three albums "ALBUM#1", "ALBUM#2", and "ALBUM#3" are stored. An explanation of a DB table formation method and the like will be omitted.

In this embodiment, assume that the DB has an unlimited storage area, and no limitations are imposed on, e.g., the number of albums formable by the owner, and the number and size of image data registrable in each album.

An APP 105 which operates on the Web server executes application software. More specifically, the APP 105 is a central processing unit (CPU). The APP 105 reads out application software stored in a random access memory (RAM) or read only memory (ROM) of the Web server 101 or in an external storage device connected to the Web server 101, receives commands from the readout software, and executes various processes concerning the Web album service (to be described in detail later). If necessary, the APP 105 can receive commands from application software or an operating system (OS), access the DB 104, and perform processing such as registration, update, or delete of a record in the DB 104.

Those specifications of the APP 105, which are necessary to realize this embodiment will be explained below.

The APP 105 which realizes all functions of the Web album service receives an entity body posted by HTTP POST from the client PC 102, performs necessary processing such as access to the DB 104, and returns an appropriate HTML source to the client PC 102.

As extensively performed in normal HTTP POST, the entity body has a structure in which "variable=value"s are concatenated by &, and each value is encoded into URL (Uniform Resource Locator). A detailed explanation of the structure and encoding will be omitted.

Since the APP 105 realizes all functions of the Web album service, the APP 105 normally has various functions such as delete of image data from the DB 104, and management of albums in the DB 104. In this embodiment, these functions are designated by the value of a variable FUNC included in the entity body.

In this embodiment, however, an image data registration process need only be explained, and so an entity used in this process need only be explained. Therefore, only four variables FUNC, ALBUM, NAME, and BODY and their values will be explained below.

As described above, FUNC has a function of designating processing for the APP 105. In this embodiment, the value is "regist" which means registration of image data.

ALBUM is the name of an album in which image data designated by NAME and BODY (to be described later) is to be registered.

If an album having the same name as the album name designated by ALBUM exists on the DB 104 before execution of this registration, the APP 105 does not particularly perform any processing such as new album formation, and adds the image data to the existing album. Note that the image data of the album may also be overwritten by the new image data.

If no such album exists on the DB 104, the APP 105 forms on the DB 104 a new album having the album name designated by ALBUM, and registers the image data in this album.

NAME is a character string which is registered as a name when image data BODY (to be described below) is registered in the album designated by ALBUM.

In this embodiment, NAME is processed as an image identifier unique to each album. That is, when registering, in an album designated by ALBUM, new image data whose name designated by NAME is the same as the existing image data, the APP 105 erases the existing image data, and writes the new image data designated by BODY. Note that BODY is the body of image data to be actually registered in the DB 104.

The client PC 102 is used by the owner to upload image data to the DB 104 via the Web server 101. An OS such as Windows (registered trademark) and a Web browser 106 such as Internet Explorer (registered trademark) are installed in the client PC 102, and the client PC 102 operates by receiving commands from these software programs. The client PC 102 also has an AddOn 107 which simply uploads image data by receiving commands from application software incorporated into the Web browser 106. More specifically, the AddOn 107 is the CPU of the client PC.

Figure 2:
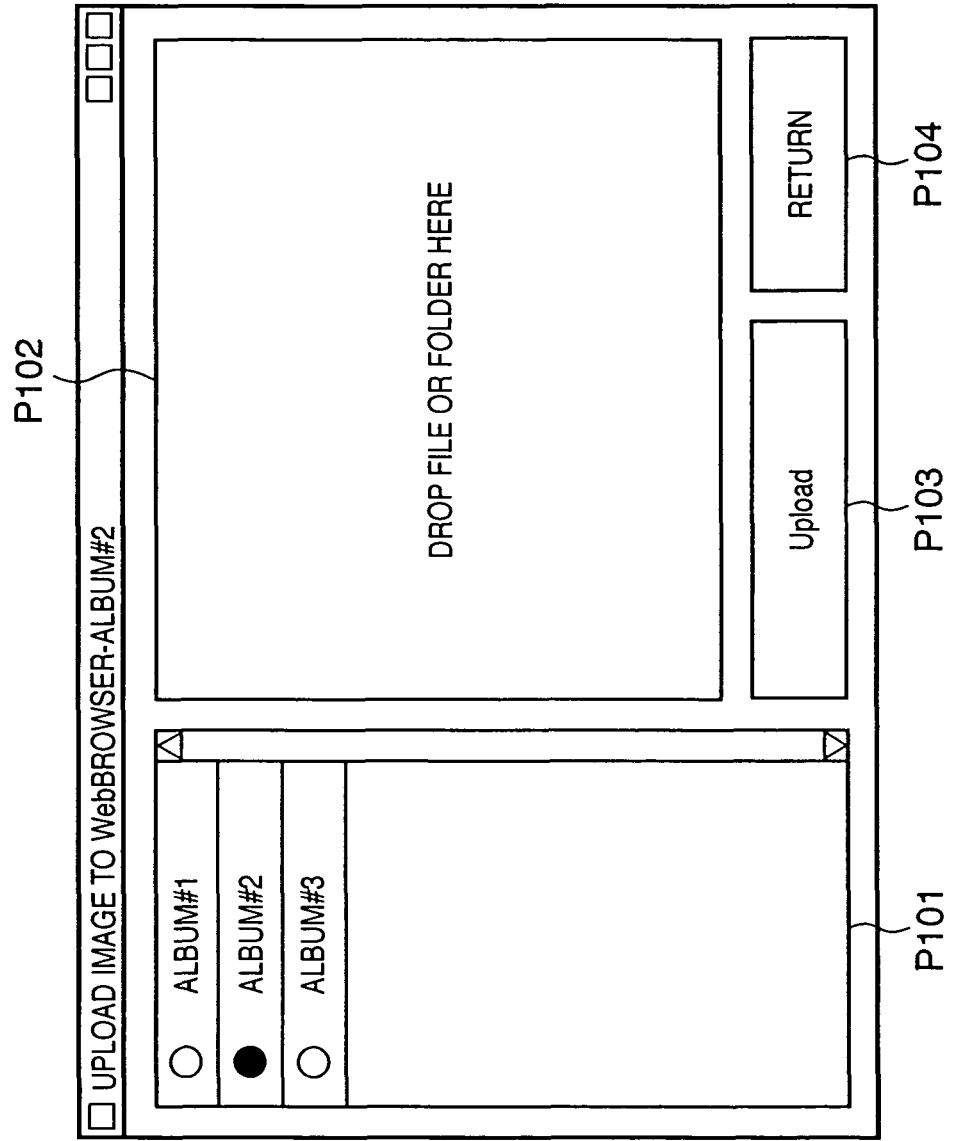
FIG. 2 is a view showing a window in which an owner uploads and registers an image file to an album.

FIG. 2 shows a window which the client PC 102 of the owner performs display on the display device by receiving commands from the Web browser 106, when uploading and registering image data in a Web album on the DB 104.

Reference symbol P101 denotes a list of albums owned by the owner. Referring to FIG. 2, the owner owns three albums "ALBUM#1", "ALBUM#2", and "ALBUM#3", and "ALBUM#2" is currently selected.

Reference symbol P102 denotes an upload designating area for designating a file or folder to be uploaded by drag & drop. The AddOn 107 senses whether information is input from a pointing device to the upload designating area P102. In this embodiment, however, when drag & drop of a folder is input from the pointing device, not a file list below the folder but the folder itself is displayed in the upload designating area P102.

Figure 3:
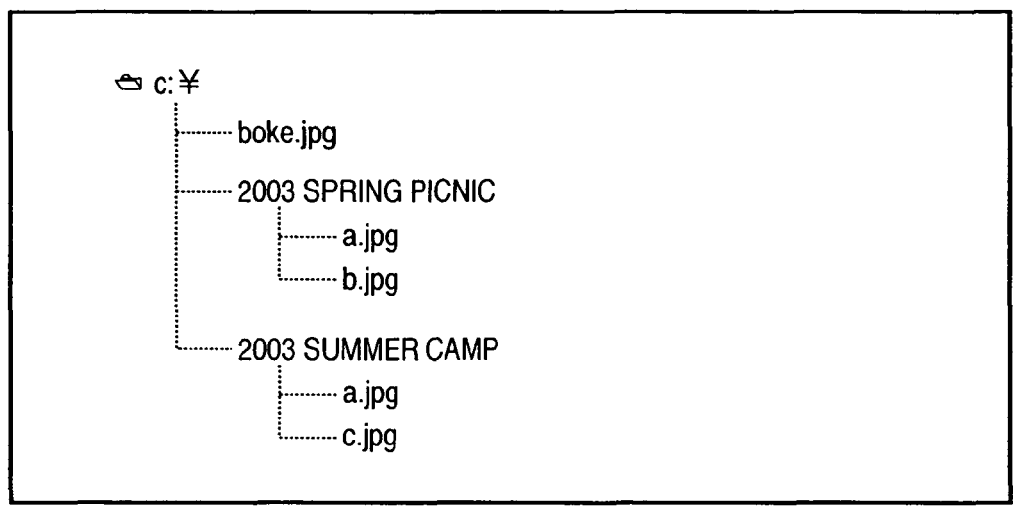
FIG. 3 is a view showing the statuses of files and folders.
Figure 4:
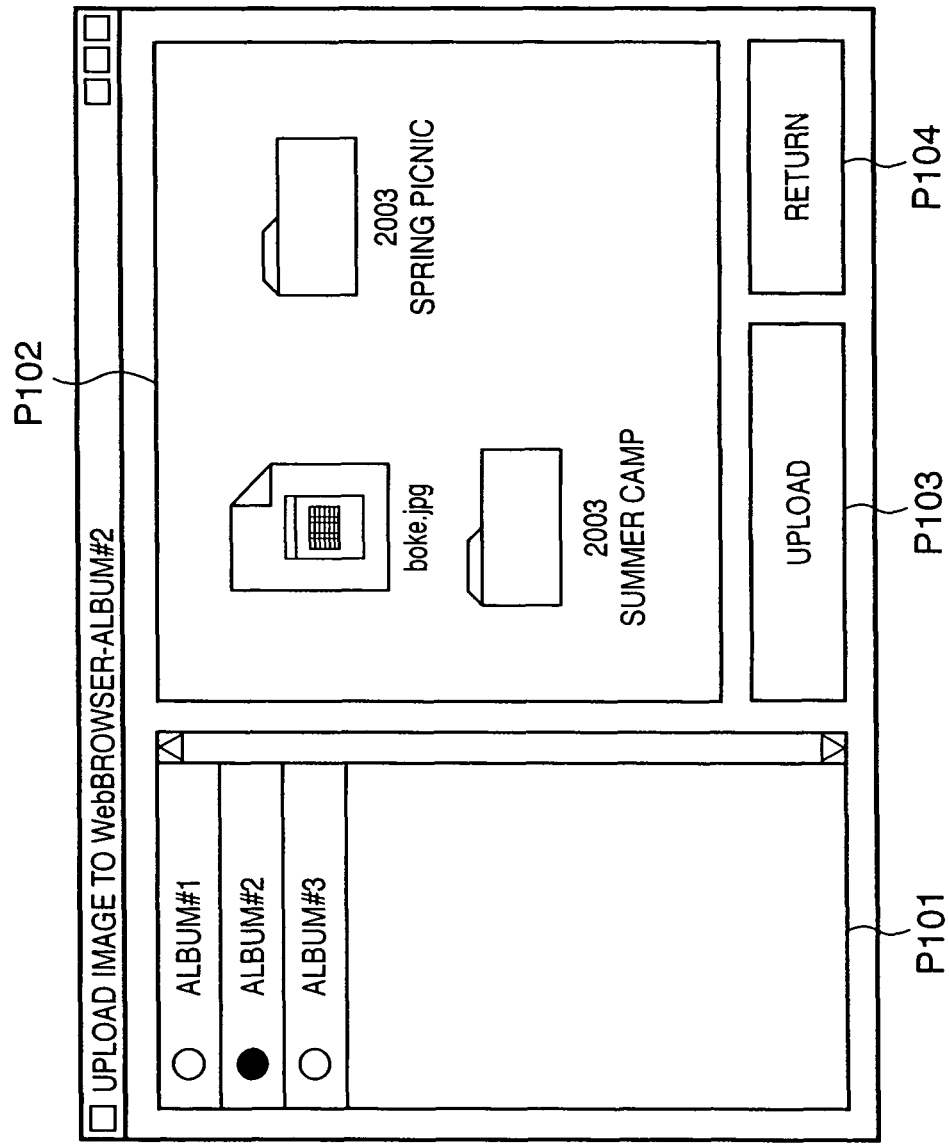
FIG. 4 is a view showing a window for uploading and registering the files and folders having the arrangement shown in FIG. 3 to an album.

For example, in the statuses of files and folders as shown in FIG. 3, if three items, i.e., a file "boke.jpg", a folder "2003 Spring Picnic", and a folder "2003 Summer Camp" are selected and drag & drop is input from the pointing device to the upload designating area P102, the AddOn 107 of this embodiment displays the folders as shown in FIG. 4 on the display device.

On the other hand, if the folder "2003 Spring Picnic" alone is selected and drag & drop is input from the pointing device to the upload designating area P102, the folder name is discarded, and the result is the same as when "a.jpg" and "b.jpg" immediately below this folder undergo drag & drop.

Reference symbol P103 denotes a button for inputting designation of the start of upload from the pointing device. When the button P103 is clicked by the pointing device, the AddOn 107 activates UPLOAD processing. Details of the UPLOAD processing will be explained later.

Reference symbol P104 denotes a button for inputting from the pointing device designation of termination without performing any upload. When the button P104 is clicked by the pointing device, a predetermined page is displayed without performing any upload, regardless of whether a file or folder is designated. In this embodiment, an explanation of this predetermined page will be omitted.

Figure 5:
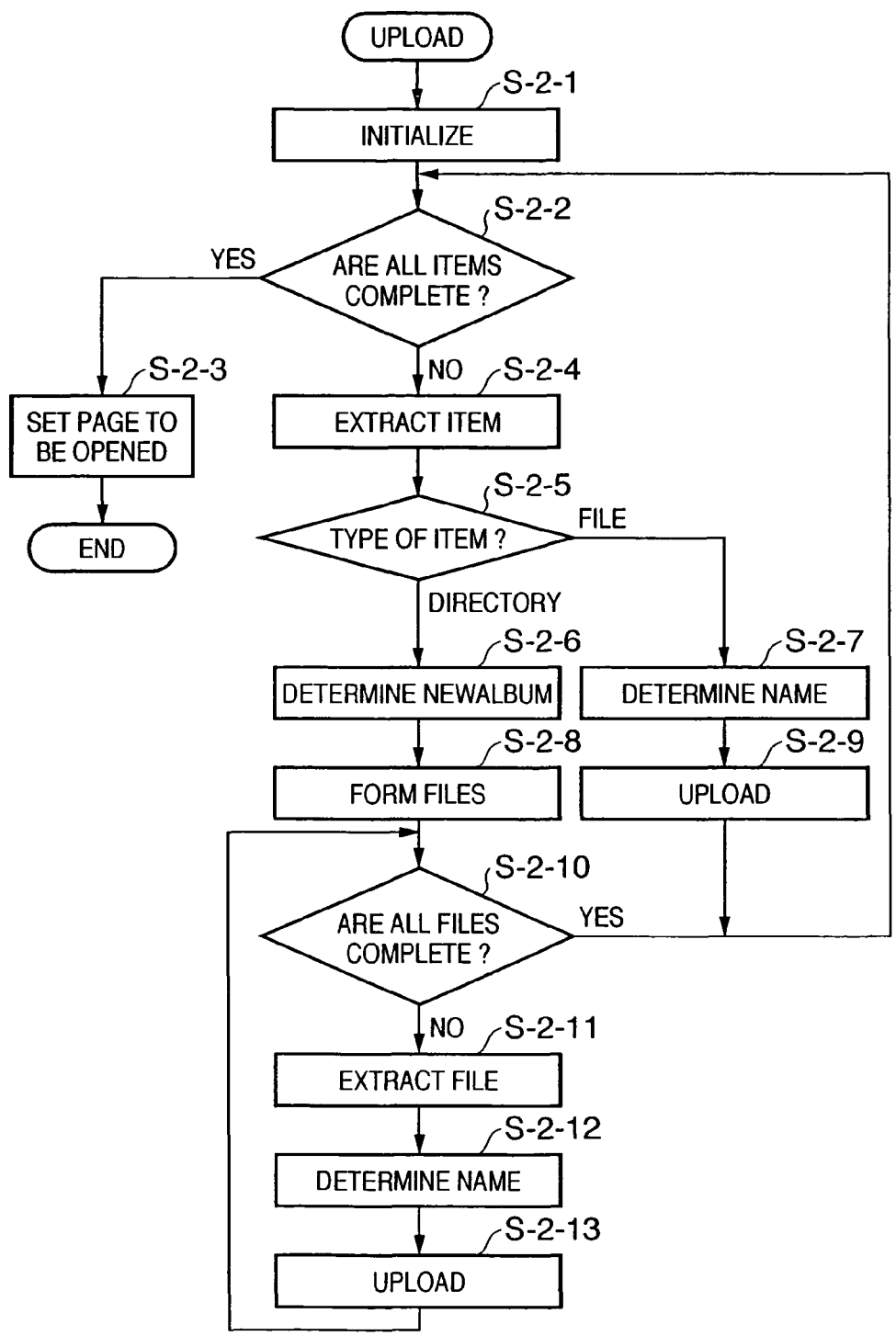
FIG. 5 is a flowchart describing details of UPLOAD processing performed in an AddOn.

FIG. 5 is a flowchart showing details of the UPLOAD processing performed by the AddOn 107 of the client PC 102.

In step S-2-1, the AddOn 107 initializes information necessary for the subsequent processing. Examples of the information are ALBUM as a currently selected album name, ALL_ITEM as a list of items to be uploaded, FILES as a list of files contained in a folder, ITEM which stores items extracted from ALL_ITEM and FILES, URL as the destination of data upload, and NEWALBUM as an album name generated from the folder name.

In step S-2-2, the AddOn 107 determines whether unprocessed items remain in ALL_ITEM. If no item remains, the flow advances to step S-2-3. If items remain, the flow advances to step S-2-4.

In step S-2-3, the AddOn 107 sets a predetermined page to be opened when the UPLOAD processing is complete, and terminates the UPLOAD processing. Although an album display window is usually opened, a page to be opened is irrelevant to this application, so an explanation thereof will be omitted.

In step S-2-4, the AddOn 107 selects one unprocessed item contained in ALL_ITEM, and stores it in ITEM.

In step S-2-5, the AddOn 107 determines the type of ITEM. More specifically, the AddOn 107 determines whether ITEM is a file or folder. If the AddOn 107 determines that ITEM is a file, the flow advances to step S-2-7. If the AddOn 107 determines that ITEM is a folder, the flow advances to step S-2-6.

If ITEM is found to be a file, in step S-2-7, the AddOn 107 extracts from ITEM the variable NAME indicative of the name of image data to be registered in the album. In this embodiment, the last element of the path, i.e., a.jpg if ITEM is c:¥foo¥bar¥a.jpg, is NAME.

In step S-2-9, with respect to the variable ALBUM indicating the album name, the AddOn 107 posts, to URL by using HTTP PT, the contents of the file indicated by ITEM as image data by using NAME as the image name, thereby completing the image data registration request to the APP 105. The flow then returns to step S-2-2. The APP 105 having received this POST registers the image data in the album in accordance with the specifications described earlier.

If the AddOn 107 determines in step S-2-5 that ITEM is a folder, in step S-2-6, an album name is generated from ITEM and stored in NEWALBUM. In this embodiment, as in step S-2-7, the last element of ITEM, i.e., bar if ITEM is "c:¥foo¥bar", is NEWALBUM.

Subsequently, in step S-2-8, the AddOn 107 forms in FILES a list of files existing below the folder designated by ITEM. This processing is generally often performed, so a detailed explanation thereof will be omitted.

In step S-2-10, the AddOn 107 determines whether unprocessed files remain in FILES. If no unprocessed file remains, the flow returns to step S-2-2.

If the AddOn 107 determines in step S-2-10 that unprocessed files remain in FILES, in step S-2-11, the AddOn 107 selects one file and loads it into ITEM.

In step S-2-12, as in step S-2-7, the AddOn 107 determines, from the last element of ITEM, the name NAME of the image data when it is registered in the album.

In step S-2-13, as in step S-2-9, with respect to the album name NEWALBUM, the AddOn 07 posts, to URL by using HTTP POST, an image data registration request by using NAME as the image name and the file designated by ITEM as image data. After that, the AddOn 107 returns to step S-2-10.

On the other hand, the APP 105 having received POST registers the image data in the album NEWALBUM. As has already been explained, if no NEWALBUM exists on the DB 104, the APP 105 first forms the album NEWALBUM on the DB 104, and then performs the image registration process.

The UPLOAD processing executed by the AddOn 107 of the client PC 102 will be described in detail below by applying the flowchart shown in FIG. 5 to the window as shown in FIG. 4.

In step S-2-1, the AddOn 107 reads out various pieces of information input from the window shown in FIG. 4, and sets variables as shown in FIG. 6 from the value of the argument of UPLOAD.

In this embodiment, the AddOn 107 sets in ALBUM the album selected in P101, i.e., "ALBUM#2" in the case shown in FIG. 4 as a variable.

In ALL_ITEM, the AddOn 107 sets the path of a file or folder dropped in P102, i.e., "c:¥boke.jp", "c:¥2003 Spring Picnic", and "c:¥2003 Summer Camp" as the full paths of "boke.jpg", "2003 Spring Picnic", and "2003 Summer Camp".

URL is the destination of upload (POST) of an image. The AddOn 107 sets in URL a value externally given when UPLOAD is called.

After the initialization as described above is complete in step S-2-1, the flow advances to step S-2-2, and the AddOn 107 selects an unprocessed item "c:¥boke.jpg" from ALL_ITEM, stores it in ITEM, and advances to step S-2-5.

In step S-2-5, the AddOn 107 determines whether the content "c:¥boke.jpg" is a folder or file. Since "c:¥boke.jpg" is a file, the AddOn 107 advances to step S-2-7.

In step S-2-7, the AddOn 107 issues an HTTP POST request shown in FIG. 7, and returns to step S-2-2.

The APP 105 having received this HTTP POST request from the AddOn 107 receives the data posted in step S-2-7, and adds (or overwrites) boke.jpg to ALBUM#2 on the DB 104.

Note that the data shown in FIG. 7 is actually an entity obtained by encoding the values by URL encoding and concatenating the encoded values by &.

Since unprocessed items remain on ALL_ITEM in step S-2-2, the AddOn 107 selects and stores "c:¥2003 Spring Picnic" in ITEM in step S-2-5, and advances to step S-2-5.

In step S-2-5, the AddOn 107 determines whether ITEM is a file or folder. Since "c:¥2003 Spring Picnic" is a folder, the AddOn 107 advances to step S-2-6.

In step S-2-6, the AddOn 107 cuts out "2003 Spring Picnic" as NEWALBUM from ITEM, stores it in NEWALBUM, and advances to step S-2-8.

In step S-2-8, the AddOn 107 stores, in FILES, files "c:¥2003 Spring Picnic¥a.jpg" and "c:¥2003 Spring Picnic¥b.jpg" existing below the folder "c:¥2003 Spring Picnic" stored in ITEM, and advances to step S-2-10.

In step S-2-10, the AddOn 107 advances to step S-2-11 because FILES includes unprocessed files.

In step S-2-11, the AddOn 107 selects "c:¥2003 Spring Picnic¥a.jpg" from FILES, stores it in ITEM, and advances to step S-2-12.

In step S-2-12, the AddOn 107 extracts "a.jpg" as NAME from ITEM.

In step S-2-13, the AddOn 107 generates data shown in FIG. 8, and posts the generated data to URL by HTTP POST. BODY is the contents of the file indicated by ITEM. The AddOn 107 returns to step S-2-10 without particularly recognizing that the new album is formed.

The data shown in FIG. 8 is actually an entity obtained by encoding the values by URL encoding, and concatenating the encoded values by &.

The APP 105 having received POST from the AddOn 107 as described above forms a new album "2003 Spring Picnic" on the DB 104, and registers the image data BODY in this album by using the name NAME.

In step S-2-10, "c:¥2003 Spring Picnic¥b.jpg" remains in FILES, so the AddOn 107 advances to step S-2-11 again.

In step S-2-11, the AddOn 107 stores "c:¥2003 Spring Picnic" in ITEM.

Additionally, in step S-2-13, the AddOn 107 posts data shown in FIG. 9 to URL by HTTP POST, and returns to step S-2-10.

The APP 105 having received POST from the AddOn 107 as described above adds the image data BODY by using the name b.jpg to the album "2003 Spring Picnic" formed previously.

Since no more unprocessed file remains in FILES in step S-2-10, the AddOn 107 returns to step S-2-2.

In step S-2-2, an unprocessed item "c:¥2003 Summer Camp" remains in ALL_ITEM. In step S-2-3, therefore, the AddOn 107 selects and stores "c:¥2003 Summer Camp" in ITEM.

After that, the same processing as that for "c:¥2003 Spring Picnic" progresses, and the AddOn 107 performs HTTP POST shown in FIGS. 10 and 11. Since no more unprocessed item exists in ALL_ITEM in step S-2-2, the AddOn 107 advances to step S-2-3.

In step S-2-3, the AddOn 107 sets another page to be opened after the image data is registered. Note that the properties and the like of the page to be opened are irrelevant to this embodiment, so an explanation thereof will be omitted.

When completing step S-2-3, the AddOn 107 terminates the UPLOAD processing.

Second Embodiment

In the first embodiment, if no album having the same name as a folder to be uploaded exists on the DB 104, it is possible to automatically form a new album and register the designated image data. However, it is necessary to separately set attribute information related to the album, e.g., a list of guests to whom the album is to be opened, and permission information for reading, printing or downloading of images in the album.

To solve this problem, the first embodiment is extended to transfer a selected album name CURRENT, in addition to the album name of the registration destination, to data to be posted by HTTP POST by an AddOn 107.

For example, since "ALBUM#2" is selected in FIG. 4 in an entity shown in FIG. 10 which is posted from the AddOn 107 to an APP 105, the value of CURRENT is "ALBUM#2" as shown in FIG. 12.

Since CURRENT is added to the entity to be posted, the APP 105 of the second embodiment has the following specification in addition to the specifications of the APP 105 described in the first embodiment.

If an album designated by CURRENT exists on a DB 104 when an album name not existing on the DB 104 is designated by ALBUM, album attribute information related to the album of CURRENT is copied to the album attribute information of a new album.

Note that the album attribute information includes at least a list which contains the mail addresses of guests to whom the album is to be opened.

In the first and second embodiments, HTTP POST alone is used to send data to the APP 105, and, in order to register one image data, the whole transfer process is done by performing this HTTP POST only once. However, the same effect can also be obtained by transferring, e.g., BODY by using another connection (e.g., FTP).

As has been explained above, in the first embodiment, when a folder is selected as an object to be uploaded, this folder is processed as an album name. This makes it possible to avoid the complicatedness of album formation and album name input, and obviate the need to repeat the uploading process for each album.

In the second embodiment, if no album having the same name as the folder name exists, an album having the same mane as the folder name is formed. However, the attribute information of this album takes over the attribute information of an album chosen when the uploading process is activated. This eliminates the need to reset attribute information including a list of quests to whom the album is to be opened.

Figure 13:
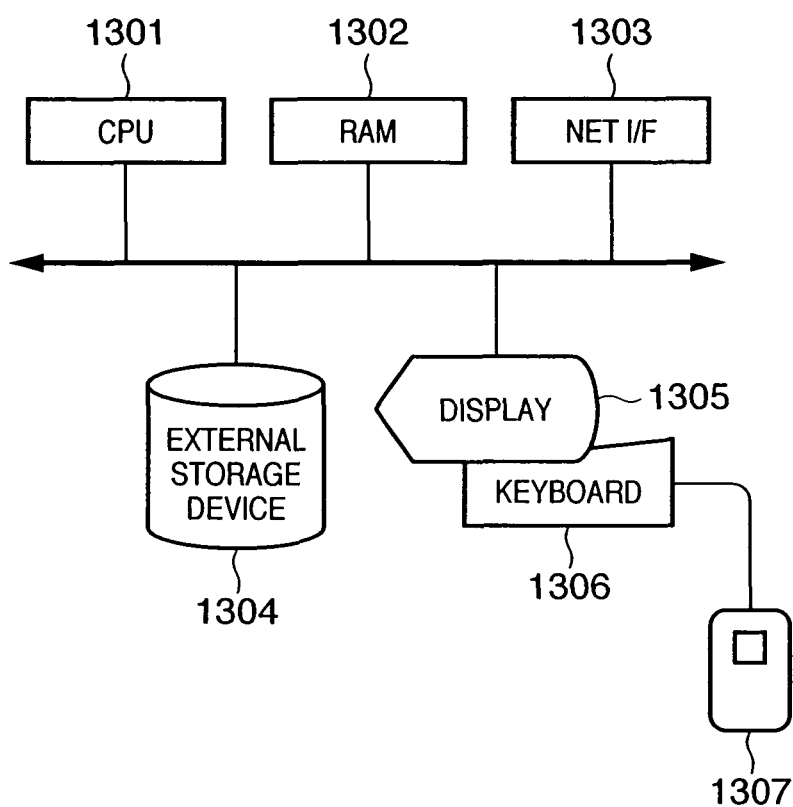
FIG. 13 is a block diagram showing the arrangement of a computer system.

Finally, an example of the computer system forming the Web server 101 or client PC 102 will be described below with reference to a block diagram of FIG. 13. In FIG. 13, reference numeral 1301 denotes a CPU which controls the whole system in accordance with a control program stored in a RAM 1302; 1302, an internal storage unit such as a RAM which stores, e.g., the system control program to be executed by the CPU 1301, document data, and a session object for managing the state of the client 102; and 1303, a network interface which connects to and exchanges data with a network such as the Internet under the control of the CPU 1301.

Reference numeral 1304 denotes an external storage device such as a magnetic disk which stores files; 1305, a display; 1306, a keyboard; and 1307, a pointing device such as a mouse. The control program stored in the RAM 1302 uses, if necessary, functions of an OS (Operating System) similarly stored in the RAM 1302, and performs predetermined operations by reading and writing the contents of data to be temporarily stored in the RAM 1302, exchanging data via the network interface 1303, receiving inputs from the keyboard 1306 and pointing device 1307, and displaying information on the display 1305.

Although the control program is stored in the RAM 1302 in the above computer system, it is also possible to execute the control program loaded from the external storage device 1304 or received via the network interface 1303. Alternatively, it is possible to execute the control program loaded from a read only internal storage unit such as a ROM, although not shown in FIG. 2.

Furthermore, in place of or in addition to the keyboard 1306 and pointing device 1307, another input device such as a voice input device may also be used. Also, it is not always necessary to use all these components. That is, in the server 101, the display 1305 is often omitted, or the keyboard 1306 or pointing device 1307 is often shared by another computer.

In the embodiments as described above, it is possible to alleviate the complicatedness of the operation of uploading an image file on a PC to an album site.

Other Embodiments

The objects of the individual embodiments can also be achieved by supplying a storage medium (or recording medium) storing the program code of software for implementing the functions of the embodiments to a system or apparatus, and reading out and executing the program code stored in the storage medium by a computer (or a CPU or MPU) of the system or apparatus. In this case, the program code read out from the storage medium implements the functions of the embodiments, and the storage medium storing this program code constitutes the invention. Also, besides the functions of the above embodiments are implemented by executing the readout program code by the computer, the present invention includes a case where an operating system (OS) or the like running on the computer performs part or the whole of actual processing on the basis of designations by the program code and thereby implements the functions of the embodiments.

Furthermore, the present invention also includes a case where the program code read out from the storage medium is written in a memory of a function expansion card inserted into the computer or of a function expansion unit connected to the computer, and, on the basis of designations by the program code, a CPU or the like of the function expansion card or function expansion unit performs part or the whole of actual processing and thereby implements the functions of the above embodiments.

When the present invention is applied to the storage medium described above, this storage medium stores a program code corresponding to the flowchart explained previously.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2004-038816 filed on Feb. 16, 2004, and Japanese Patent Application No. 2005-025505 filed on Feb. 1, 2005, which are hereby incorporated by reference herein.

What is claimed is:

1. An information processing system comprising a server apparatus and a client apparatus which is connected to the server apparatus via a network, wherein the server apparatus includes a data storage area and manages data by registering the data in a managed group of data, wherein management of data in a managed group in the server apparatus is different from management of data in a folder in the client apparatus, wherein the client apparatus comprises:
a memory and a processor;
a managing device configured to manage a plurality of data in the client apparatus, wherein the plurality of data has corresponding data names and is managed by a folder having a folder name;
a designation device configured to designate at least one folder from folders which already exist in the client apparatus;
an extracting device configured to extract the folder name of the folder designated by said designation device; and
a sending device configured to send the folder name extracted by said extraction device and data managed by the folder which is designated by said designation device to the server apparatus, and wherein the server apparatus comprises:
a memory and a processor;
a receiving device configured to receive the folder name and the data from the client apparatus;
a generating device configured to generate a managed group which has a managed group name which includes at least a part of the received folder name; and
a registration device configured to register the data under a data name which includes at least a part of a name of the received data, wherein the data is registered in the managed group with the managed group name generated by the generating device.

2. A server apparatus which includes a data storage area and which manages data by registering the data in a managed group of data, wherein management of data in a managed group is different from management of data in a folder, said server apparatus comprising:
a memory and a processor;
a receiving device configured to receive, from a client apparatus, a folder name extracted by the client apparatus from a folder which already exists in the client apparatus and data managed by the folder;
a generating device configured to generate a managed group which has a managed group name which includes at least a part of the received folder name; and
a registration device configured to register the data under a data name which includes at least a part of a name of the received data, wherein the data is registered in the managed group with the managed group name generated by the generating device.

3. The server apparatus according to claim 2, further comprising a determining device configured to determine whether the managed group name including a part of the received folder name exists in the data storage area, wherein said registration device registers the received data by adding to data having the managed group name which already exists in the data storage area when said determining device determines that the managed group name including a part of the received folder name exists in the data storage area.

4. The server apparatus according to claim 2, further comprising an instruction device configured to display a graphical user interface to a user to input the data or the folder, wherein the user selects the data or the folder by dragging and dropping on a display device which is arranged in the client apparatus.

5. The server apparatus according to claim 2, further comprising a setting device configured to set attribute information corresponding to the managed group, wherein said setting device sets the attribute information corresponding to the managed group as attribute information of the managed group, and wherein the attribute information includes information of another party to open data to.

6. A method of controlling a server apparatus which includes a data storage area and which manages data by registering the data in a managed group of data, wherein management of data in a managed group is different from management of data in a folder, said method comprising the steps of:
receiving, from a client apparatus, a folder name extracted by the client apparatus from a folder which already exists in the client apparatus and data managed by the folder;
generating a managed group which has a managed group name which includes at least a part of the received folder name; and
registering the data under a data name which includes at least a part of a name of the received data, wherein the data is registered in the managed group with the managed group name generated by the generating step.

7. The method according to claim 6, further comprising a step of determining whether the managed group name including a part of the received folder name exists in the data storage area, wherein the received data are registered in said registering step by adding to data having the managed group name which already exists in the data storage area when said determining step determines that the managed group name including a part of the received folder name exists in the data storage area.

8. The method according to claim 6, wherein the client apparatus comprises an instruction device configured to display a graphical user interface to a user to input the data or the folder, wherein the data or the folder is selected by dragging and dropping on a display device which is arranged in the client apparatus.

9. The method according to claim 6, further comprising a step of setting attribute information corresponding to the managed group, wherein the attribute information corresponding to the managed group is set as attribute information of the managed group, and wherein the attribute information includes information of another party to open data to.

10. A non-transitory storage medium on which is stored a computer-executable program which implements a method of controlling a server apparatus which includes a data storage area and which manages data by registering the data in a managed group of data, wherein management of data in a managed group is different from management of data in a folder, comprising the steps of:
receiving, from a client apparatus, a folder name extracted by the client apparatus from a folder which already exists in the client apparatus and data managed by the folder;
generating a managed group which has a managed group name which includes at least a part of the received folder name; and
registering the data under a data name which includes at least a part of a name of the received data, wherein the data is registered in the managed group with the managed group name generated by the generating step.

11. The server apparatus according to claim 2, wherein the folder includes a plurality of images, and the managed group is a Web album in which the plurality of images are registered.

12. A client apparatus which is connected via a network to a server apparatus which manages data by registering the data in a managed group of data, wherein management of data in a managed group in the server apparatus is different from management of data in a folder in the client apparatus, the client apparatus comprising:
a memory and a processor;
a managing device configured to manage a plurality of data in the client apparatus, wherein the plurality of data has corresponding data names and is managed by a folder having a folder name;
a designation device configured to designate at least one folder from folders which already exist in the client apparatus;
an extraction device configured to extract the folder name of the folder designated by said designation device; and
a sending device configured to send the folder name extracted by the extraction device and data managed by the folder which is designated by the designation device to the server apparatus,
wherein at least a part of the folder name sent by said sending device is included in a managed group name which is generated in the server apparatus and the data sent by said sending device is registered in the managed group with the managed group name generated in the server apparatus.

13. The client apparatus according to claim 12, further comprising a display control device configured to display a selection result of selection of data or a folder on a predetermined display area of a display device.

14. The client apparatus according to claim 13, wherein said display control device displays information designating the selected data together with information designating the selected folder on the predetermined display area.

15. The client apparatus according to claim 13, wherein the data or the folder is selected by dragging and dropping the information to the predetermined display area.

16. A method of controlling a client apparatus which is connected via a network to a server apparatus which manages data by registering the data in a managed group of data, wherein management of data in a managed group in the server apparatus is different from management of data in a folder in the client apparatus, the method comprising the steps of:
   managing a plurality of data in the client apparatus, wherein the plurality of data has corresponding data names and is managed by a folder having a folder name;
   designating at least one folder from folders which already exist in the client apparatus;
   extracting the folder name of the folder designated by the designating step; and
   sending the folder name extracted by the extracting step and data managed by the folder which is designated by the designating step to the server apparatus,
   wherein at least a part of the folder name sent by said sending step is included in a managed group name which is generated in the server apparatus and the data sent by the sending step is registered in the managed group with the managed group name generated in the server apparatus.

17. A non-transitory storage medium on which is stored a computer-executable program which implements a method of controlling a client apparatus which is connected via a network to a server apparatus which manages data by registering the data in a managed group of data, wherein management of data in a managed group in the server apparatus is different from management of data in a folder in the client apparatus, comprising the steps of:
   managing a plurality of data in the client apparatus, wherein the plurality of data has corresponding data names and is managed by a folder having a folder name;
   designating at least one folder from folders which already exist in the client apparatus;
   extracting the folder name of the folder designated by the designating step; and
   sending the folder name extracted by the extracting step and data managed by the folder which is designated by the designating step to the server apparatus,
   wherein at least a part of the folder name sent by said sending step is included in a managed group name which is generated in the server apparatus and the data sent by the sending step is registered in the managed group with the managed group name generated in the server apparatus.

\* \* \* \* \*